(12) United States Patent
Minegishi

(10) Patent No.: US 8,700,758 B2
(45) Date of Patent: Apr. 15, 2014

(54) MONITORING SYSTEM, APPARATUS TO BE MONITORED, MONITORING APPARATUS, AND MONITORING METHOD

(75) Inventor: Akira Minegishi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1308 days.

(21) Appl. No.: 11/059,553

(22) Filed: Feb. 17, 2005

(65) Prior Publication Data

US 2006/0129674 A1    Jun. 15, 2006

(30) Foreign Application Priority Data

Nov. 26, 2004  (JP) ................................. 2004-342134

(51) Int. Cl.
G06F 15/173   (2006.01)
G06F 15/16    (2006.01)

(52) U.S. Cl.
USPC ............ 709/224; 709/217; 709/218; 709/223

(58) Field of Classification Search
USPC ................................................ 709/224, 223
See application file for complete search history.

(56) References Cited

U.S. PATENT DOCUMENTS

| 6,470,385 | B1 * | 10/2002 | Nakashima et al. | 709/224 |
|---|---|---|---|---|
| 6,714,552 | B1 * | 3/2004 | Cotter | 370/406 |
| 6,862,607 | B1 * | 3/2005 | Vermeulen | 709/213 |
| 6,993,784 | B1 * | 1/2006 | Shinotsuka | 725/74 |
| 7,024,474 | B2 * | 4/2006 | Clubb et al. | 709/223 |
| 7,240,364 | B1 * | 7/2007 | Branscomb et al. | 726/9 |
| 7,246,156 | B2 * | 7/2007 | Ginter et al. | 709/217 |
| 7,398,530 | B1 * | 7/2008 | Parla et al. | 719/318 |
| 2002/0004812 | A1 | 1/2002 | Motoyama | |
| 2002/0120772 | A1 | 8/2002 | Yada et al. | |
| 2002/0152292 | A1 | 10/2002 | Motoyama et al. | |
| 2002/0169865 | A1 * | 11/2002 | Tarnoff | 709/223 |
| 2003/0154271 | A1 * | 8/2003 | Baldwin et al. | 709/223 |
| 2004/0122972 | A1 | 6/2004 | Gibson et al. | |
| 2004/0260808 | A1 * | 12/2004 | Strutt | 709/224 |

FOREIGN PATENT DOCUMENTS

| JP | 2001-67291 | 3/2001 |
|---|---|---|
| JP | 2001-160013 | 6/2001 |
| JP | 2002-163164 A | 6/2002 |
| JP | 2000-066980 A | 3/2003 |
| WO | 98/39868 A2 | 9/1998 |

OTHER PUBLICATIONS

Chinese Office Action dated Sep. 7, 2007, Application No. 200510053563.8.

OTHER PUBLICATIONS

Notice of Grounds of Rejection dated Aug. 19, 2009 issued in corresponding Japanese Patent Application No. 2004-342134.
European Search Report dated Feb. 17, 2009 issued in corresponding European Patent Application No. 05251127.6-2416.

* cited by examiner

Primary Examiner — Joseph Greene
(74) Attorney, Agent, or Firm — Westerman, Hattori, Daniels & Adrian, LLP

(57) ABSTRACT

The present invention is directed to enable a monitoring apparatus to reliably obtain information of an event which occurs in an apparatus to be monitored in a monitoring system employing a connectionless communication method. An apparatus to be monitored comprises: a first transmitting unit for transmitting first information as event information related to an event in the apparatus to be monitored to a monitoring apparatus by a connectionless communication method; and a second transmitting unit for transmitting second information as the event information to the monitoring apparatus by a communication method different from the connectionless communication method. The monitoring apparatus comprises: a first receiving unit for receiving the first information transmitted from the first transmitting unit; and a second receiving unit for receiving the second information transmitted from the second transmitting unit.

19 Claims, 3 Drawing Sheets

MONITORING SYSTEM, APPARATUS TO BE MONITORED, MONITORING APPARATUS, AND MONITORING METHOD

BACKGROUND OF THE INVENTION

1) Field of the Invention

The present invention relates to a technique of monitoring an apparatus to be monitored in a monitoring system using a connectionless communication method (for example, a server system or a network system using an SNMP (Simple Network Management Protocol) trap).

2) Description of the Related Art

Hitherto, in a monitoring (management) system in a server system, a network system, or the like, the SNMP (Simple Network Management Protocol) as a network monitoring (management) protocol employing a connectionless communication method is widely mounted and used.

The monitoring system using the SNMP is constructed by, for example, an apparatus to be monitored and a monitoring apparatus which are connected to each other via a network. At the time of occurrence of an event in the apparatus to be monitored, by transmitting an SNMP trap as event information from the apparatus to be monitored to the monitoring apparatus, the event can be notified to the monitoring apparatus.

However, the SNMP trap is sent by a connectionless communication method conformed with a UDP (User Datagram Protocol) and a communication path is not established prior to communication. Consequently, there is the possibility that the SNMP trap is lost on the communication path (on the network) or on the monitoring apparatus side, and the monitoring apparatus cannot recognize the notification of the event from the apparatus to be monitored.

The SNMP trap is characterized in that, since it is transmitted by communication conformed with the UDP as a connectionless communication method, the SNMP trap can be realized with a relatively simple mechanism and notification can be sent at high speed but, on the other hand, the reliability is low.

To improve the reliability of the SNMP trap, a technique of providing a plurality of monitoring apparatuses, transmitting an SNMP trap from an apparatus to be monitored to each of the plurality of monitoring apparatuses, and inquiring the monitoring apparatuses each other, thereby recognizing loss of the SNMP trap (refer to, for example, Japanese Patent Application Laid-Open No. 2001-67291) and a technique of designating numbers to SNMP traps and checking a drop in the numbers, thereby recognizing loss of an SNMP trap (refer to, for example, Japanese Patent Application Laid-Open No. 2001-160013) are proposed.

However, in the technique disclosed in Japanese Patent Application Laid-Open No. 2001-67291, since the SNMP trap is sent to each of the plurality of monitoring apparatuses, the probability of loss of the SNMP trap can be decreased but there is the possibility that the same SNMP trap cannot reach any of the plurality of monitoring apparatuses. In such a case, the loss cannot be recognized.

In the technique disclosed in Japanese Patent Application Laid-Open No. 2001-160013, in the case where loss of a trap (loss of the SNMP trap) occurs continuously, the loss can be recognized only after loss of the continuous traps is finished, so that it takes time to recognize the initial lost trap. Therefore, in the case where the initial trap in the drop in the continuous traps is a trap related to an event which is important for the system management, the monitoring apparatus cannot recognize the important trap immediately. Thus, it is a problem from the viewpoint of the system management.

SUMMARY OF THE INVENTION

The present invention has been originated in view of such a problem and an object of the invention is to provide a monitoring system employing a connectionless communication method in which a monitoring apparatus can reliably obtain event information of an event occurring in an apparatus to be monitored, and reliably and promptly recognize loss of an event notification sent by a connectionless communication method.

Particularly, an object of the invention is, for example, in a monitoring system using an SNMP trap, to enable loss of an SNMP trap as an event notification which is important for system management to be reliably and promptly recognized and to enable a monitoring apparatus to reliably obtain the important event notification (SNMP trap).

To achieve the object, a monitoring system of the invention comprises at least one apparatus to be monitored and a monitoring apparatus for monitoring the apparatus to be monitored. Said apparatus to be monitored comprises: an event detecting unit for detecting an event in the apparatus to be monitored; a first transmitting unit for transmitting first information as event information related to an event detected by the event detecting unit to said monitoring apparatus by a connectionless communication method; and a second transmitting unit for transmitting second information as said event information to said monitoring apparatus by a communication method different from said connectionless communication method. Said monitoring apparatus comprises: a first receiving unit for receiving said first information transmitted from said first transmitting unit; and a second receiving unit for receiving said second information transmitted from said second transmitting unit.

Preferably, said monitoring apparatus comprises: a reception determining unit for determining whether or not said first receiving unit has received said first information corresponding to the second information on the basis of said second information received by said second receiving unit; and a re-transmission requesting unit for requesting said first transmitting unit of said apparatus to be monitored to re-transmit the first information in the case where the reception determining unit determines that said first receiving unit has not received said first information corresponding to said second information received by said second receiving unit.

To achieve the object, the apparatus to be monitored of the invention is an apparatus to be monitored by the monitoring apparatus and comprises: an event detecting unit for detecting an event which occurs in the apparatus to be monitored itself; a first transmitting unit for transmitting first information as event information related to an event detected by the event detecting unit to said monitoring apparatus by a connectionless communication method; and a second transmitting unit for transmitting second information as said event information to said monitoring apparatus by a communication method different from said connectionless communication method.

To achieve the object, a monitoring apparatus of the invention is a monitoring apparatus for monitoring an apparatus to be monitored, and comprises: a first receiving unit for receiving first information as event information related to an event in said apparatus to be monitored, which is transmitted from said apparatus to be monitored by a connectionless communication method; and a second receiving unit for receiving second information as said event information transmitted from said apparatus to be monitored by a communication method different from the connectionless communication method.

To achieve the object, a monitoring method of the invention is a method of monitoring an apparatus to be monitored by a monitoring apparatus, and comprises: an event detecting step of detecting an event in said apparatus to be monitored; a first transmitting step of transmitting first information as event information related to the event detected in said event detecting step from said apparatus to be monitored to said monitoring apparatus by a connectionless communication method; a second transmitting step of transmitting second information as said event information from said apparatus to be monitored to said monitoring apparatus by a communication method different from said connectionless communication method; a first receiving step of receiving said first information transmitted from said apparatus to be monitored in said first transmitting step; and a second receiving step of receiving said second information transmitted in said second transmitting step by said monitoring apparatus.

As described above, according to the invention, first information as event information of an event which occurs in the apparatus to be monitored is transmitted to the monitoring apparatus by the connectionless communication method, and second information as the event information is transmitted to the monitoring apparatus by a communication method different from the connectionless communication method. Therefore, even if the first information transmitted by the connectionless communication method is lost, the second information transmitted by a communication method different from the connectionless communication method can be reliably received by the monitoring apparatus. Thus, the monitoring apparatus can reliably obtain event information of an event in the apparatus to be monitored.

Further, since the monitoring apparatus checks whether first information, which is corresponding to the second information, is received or not on the basis of the second information, the monitoring apparatus can reliably and promptly recognize loss of the first information transmitted from the apparatus to be monitored by the connectionless communication method.

Moreover, in the case where the loss of the first information transmitted by the connectionless communication method is recognized, the monitoring apparatus can reliably obtain the first information because the first information is re-transmitted.

DESCRIPTION OF THE PREFERRED EMBODIMENTS

Embodiments of the invention will be described hereinbelow with reference to the drawings.

1. Embodiment of the Invention

Figure 1:
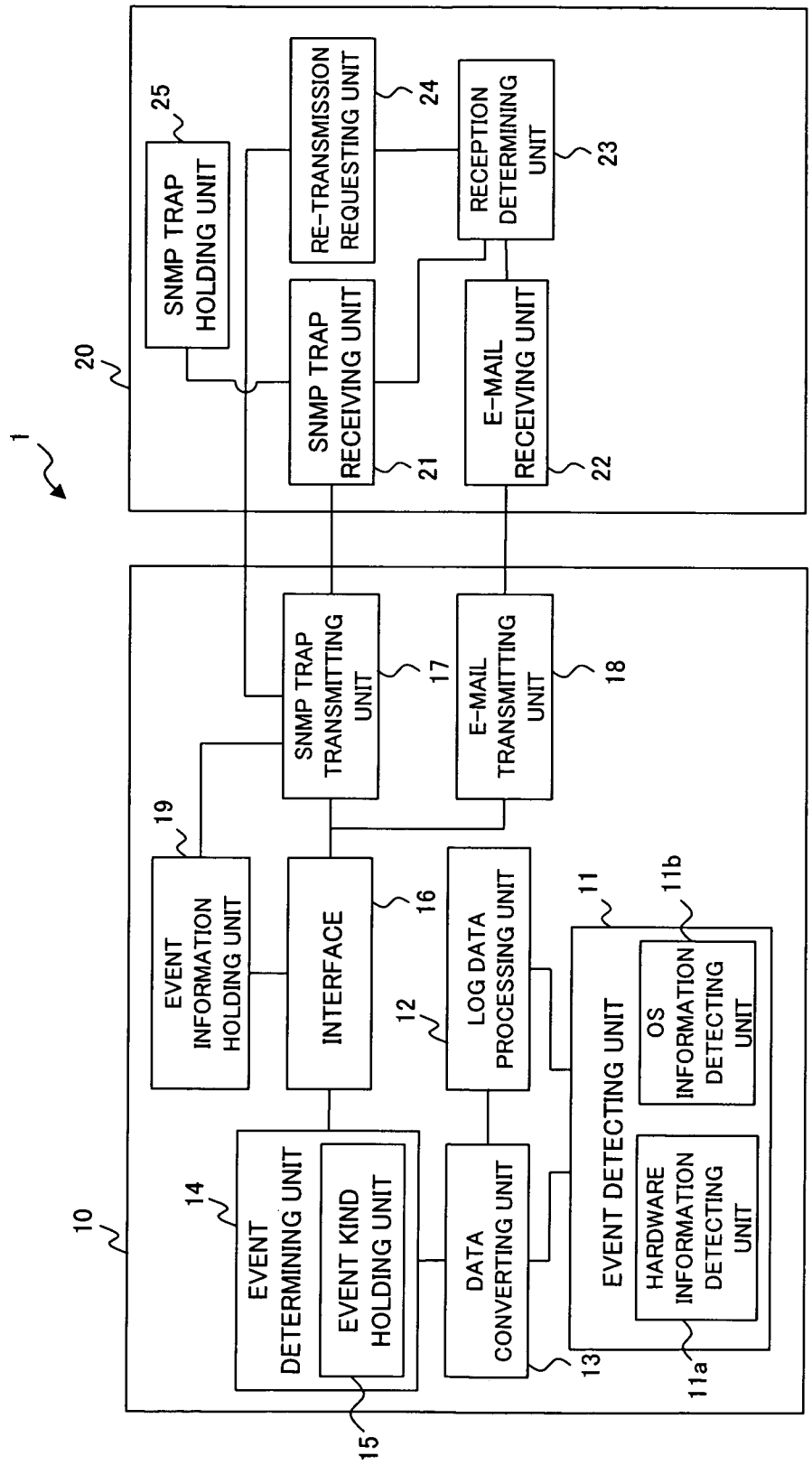
FIG. 1 is a block diagram showing a configuration of a monitoring system as an embodiment of the invention.

First, a configuration of a monitoring system 1 as an embodiment of the invention will be described with reference to the block diagram of FIG. 1. As shown in FIG. 1, the monitoring system 1 is constructed by an apparatus (agent) 10 to be monitored as an object of monitoring and a monitoring apparatus (manager) 20 for monitoring the apparatus 10 to be monitored.

The apparatus 10 to be monitored is, for example, a server. The apparatus 10 to be monitored and the monitoring apparatus 20 are connected to each other via a network such as a LAN (Local Area Network).

The apparatus 10 to be monitored includes an event detecting unit 11, a log data processing unit 12, a data converting unit 13, an event determining unit (event filter unit) 14, an interface 16, an SNMP (Simple Network Management Protocol) trap transmitting unit (first transmitting unit) 17, an e-mail transmitting unit (second transmitting unit) 18, and an event information holding unit 19.

The event detecting unit 11 detects various events which occur in the apparatus 10 to be monitored and includes a hardware information detecting unit 11a and an OS (Operating System) information detecting unit 11b.

The hardware information detecting unit 11a detects an event (for example, on/off state of the power source, disc capacity shortage, or stop of a fan) related to hardware in the apparatus 10 to be monitored.

The OS information detecting unit 11b detects an event related to the OS in the apparatus 10 to be monitored.

The log data processing unit 12 converts information (event log) related to an event detected by each of the hardware information detecting unit 11a and the OS information detecting unit 11b of the event detecting unit 11 into a form which can be handled (converted) by the data converting unit 13.

The data converting unit 13 further converts the information related to an event, converted by the log data processing unit 12 so as to be handled in the apparatus 10 to be monitored (the event determining unit 14, interface 16, and the like) and performs, for example, data conversion or data rearrangement.

The event determining unit 14 determines whether the information converted by the data converting unit 13, that is, the event detected by the event detecting unit 11 is to be transmitted by the e-mail transmitting unit 18 or not. The event determining unit 14 includes an event kind holding unit 15.

The event kind holding unit 15 is a logic table and preliminarily holds the kind of an event to be transmitted by the e-mail transmitting unit 18. The kinds of events held in the event kind holding unit 15 are, for example, kinds of events of a trouble in hardware such as stop of the fan and disc (storage) capacity shortage and a failure in the OS. In other words, the event kind holding unit 15 holds the kind of an event to be reliably obtained (recognized) by the monitoring apparatus 20, such as various failure events regarded as the most important information from the viewpoint of monitoring the system.

As described above, the event determining unit 14 functions as a filter of determining whether event information of an event detected by the event detecting unit 11 is to be transmitted to the monitoring apparatus 20 by the e-mail transmitting unit 18 or not on the basis of the event kind preliminarily held in the event kind holding unit 15.

Concretely, the event determining unit 14 checks whether the same event kind as that of the event detected by the event detecting unit 11 is held in the event kind holding unit 15 or not. If the same event kind as that of the event is held in the event kind holding unit 15, the event determining unit 14 determines that the event information of the event is to be transmitted by the e-mail transmitting unit 18. On the other hand, if the same event kind as that of the event is not held in the event kind holding unit 15, the event determining unit 14 determines that the event information of the event is not to be transmitted by the e-mail transmitting unit 18.

The interface 16 is an interface with the SNMP trap transmitting unit 17 and the e-mail transmitting unit 18 and prepare the event information so that each of the SNMP trap transmitting unit 17 and the e-mail transmitting unit 18 can transmit the event information to the monitoring apparatus 20.

The SNMP trap transmitting unit 17 transmits first information as the event information of the event detected by the event detecting unit 11 to the monitoring apparatus 20 by the connectionless communication method and transmits, as the first information, an SNMP (Simple Network Management Protocol) trap.

The SNMP trap employs connectionless communication conformed with the UDP (User Datagram Protocol).

The SNMP trap transmitting unit 17 also has a re-transmitting function of re-transmitting an SNMP trap requested to be re-transmitted from a re-transmission requesting unit 24 of the monitoring apparatus 20 which will be described later, to the monitoring apparatus 20 on the basis of the data held in the event information holding unit 19.

The e-mail transmitting unit 18 transmits the second information as the event information of the event determined to be transmitted with the e-mail transmitting unit 18 by the event determining unit 14 to the monitoring apparatus 20 by a communication method different from the connectionless communication method (preferably, a communication method of establishing a communication path prior to communication or a communication method capable of recognizing an event which cannot be transmitted on the transmission side and re-transmitting the event, even if the second information is not transmitted). In this case, the e-mail transmitting unit 18 transmits the second information by the connection communication method, concretely, by an e-mail.

As described above, the e-mail transmitting unit 18 employs the connection communication method of establishing a communication path prior to communication, so that the second information transmitted in the form of an e-mail by the e-mail transmitting unit 18 is received by an e-mail receiving unit 22 of the monitoring apparatus 20 which will be described later or, even if the second information is not received, the fact that the e-mail transmitting unit 18 side could not transmit the second information is recognized and a process of re-transmission or the like is performed.

The second information transmitted in the form of an e-mail by the e-mail transmitting unit 18 may include the same information as the information of the SNMP trap (first information) sent from the SNMP trap transmitting unit 17, or may be different from the information of the SNMP trap. The second information is at least information based on which a reception determining unit 23 of the monitoring apparatus 20 which will be described later can determine whether the SNMP trap (first information) corresponding to the second information is received by the SNMP trap receiving unit 21 or not.

The event information holding unit 19 holds the event information (SNMP trap) transmitted by the SNMP trap transmitting unit 17.

The event information held by the event information holding unit 19 may be, as described above, the event information (SNMP trap) itself transmitted by the SNMP trap transmitting unit 17, transmission record of the event information, or an event log as the original data of the SNMP trap (that is, data before conversion of the log data processing unit 12). Any event information can be used as the event information held by the event information holding unit 19 as long as the re-transmission function of the SNMP trap transmitting unit 17 can at least transmit an SNMP trap requested from the re-transmission requesting unit 24 which will be described later on the basis of the event information. The event information held by the event information holding unit 19 is at least information based on which the re-transmission function of the SNMP trap transmitting unit 17 can transmit the SNMP trap requested by the re-transmission requesting unit 24.

The monitoring apparatus 20 includes an SNMP trap receiving unit (first receiving unit) 21, the e-mail receiving unit (second receiving unit) 22, the reception determining unit 23, the re-transmission requesting unit 24, and an SNMP trap holding unit (first information holding unit) 25.

The SNMP trap receiving unit 21 receives first information (in this case, an SNMP trap) transmitted from the SNMP trap transmitting unit 17 of the apparatus 10 to be monitored.

The e-mail receiving unit 22 receives second information transmitted from the e-mail transmitting unit 18 of the apparatus 10 to be monitored.

In the monitoring system 1, the SNMP trap transmitting unit 17 of the apparatus 10 to be monitored and the SNMP trap receiving unit 21 of the monitoring apparatus 20 are connected to each other so as to be able to transmit/receive event information (SNMP trap) by the connectionless communication method to/from each other. Moreover, the e-mail transmitting unit 18 of the apparatus 10 to be monitored and the e-mail receiving unit 22 of the monitoring apparatus 20 are connected to each other so as to be able to transmit/receive event information (second information) by the connection communication method (in this case, by an e-mail) to/from each other.

The reception determining unit 23 determines whether the SNMP trap receiving unit 21 has received an SNMP trap from the SNMP trap transmitting unit 17 or not on the basis of the second information received by the e-mail receiving unit 22.

Specifically, the reception determining unit 23 determines whether an SNMP trap transmitted from the SNMP trap transmitting unit 17 of the apparatus 10 to be monitored is lost or not by checking whether or not the SNMP trap receiving unit 21 has received the SNMP trap (first information) corresponding to the second information received by the e-mail receiving unit 22 (determination of loss).

When the reception determining unit 23 determines that an SNMP trap (first information) corresponding to the second information received by the e-mail receiving unit 22 has not been received by the SNMP trap receiving unit 21, the re-transmission requesting unit 24 causes the SNMP trap transmitting unit 17 of the apparatus 10 to be monitored to re-transmit the SNMP trap.

The SNMP trap holding unit 25 holds all of SNMP traps received by the SNMP trap receiving unit 21 for the sake of system management, and a system monitor of the monitoring system 1 (an operator as a monitor operating the monitoring apparatus 20) monitors the apparatus 10 to be monitored on the basis of the SNMP traps held in the SNMP trap holding unit 25.

Figure 2:
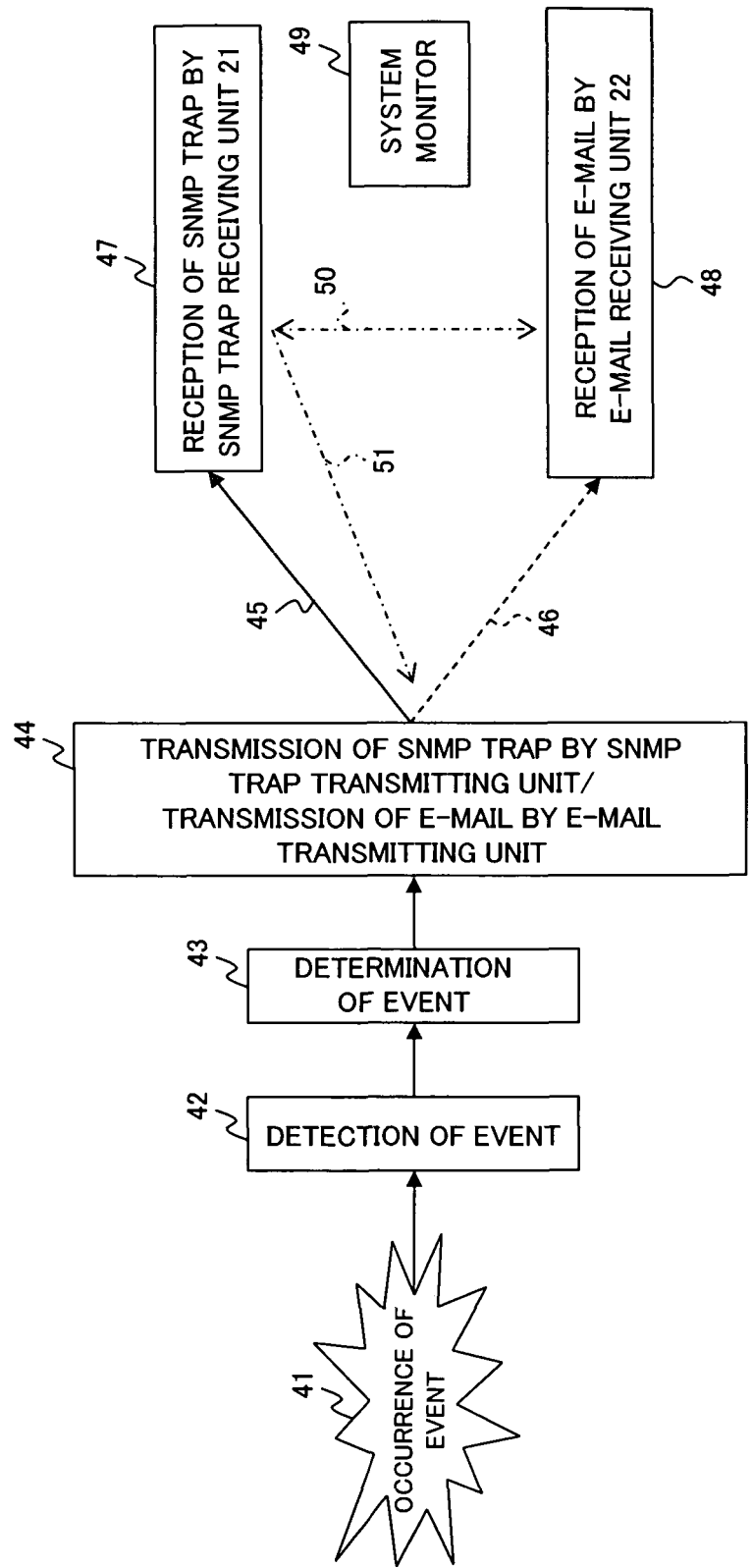
FIG. 2 is a diagram for explaining operations of the monitoring system as the embodiment of the invention.

A monitoring method as an embodiment of the invention will now be described. FIG. 2 is a diagram for explaining the operations (functions) of the monitoring system 1, and FIG. 3 is a flowchart (steps S10 to S18) for explaining the procedure of the monitoring method (operations of the monitoring system 1) as an embodiment of the invention.

Figure 3:
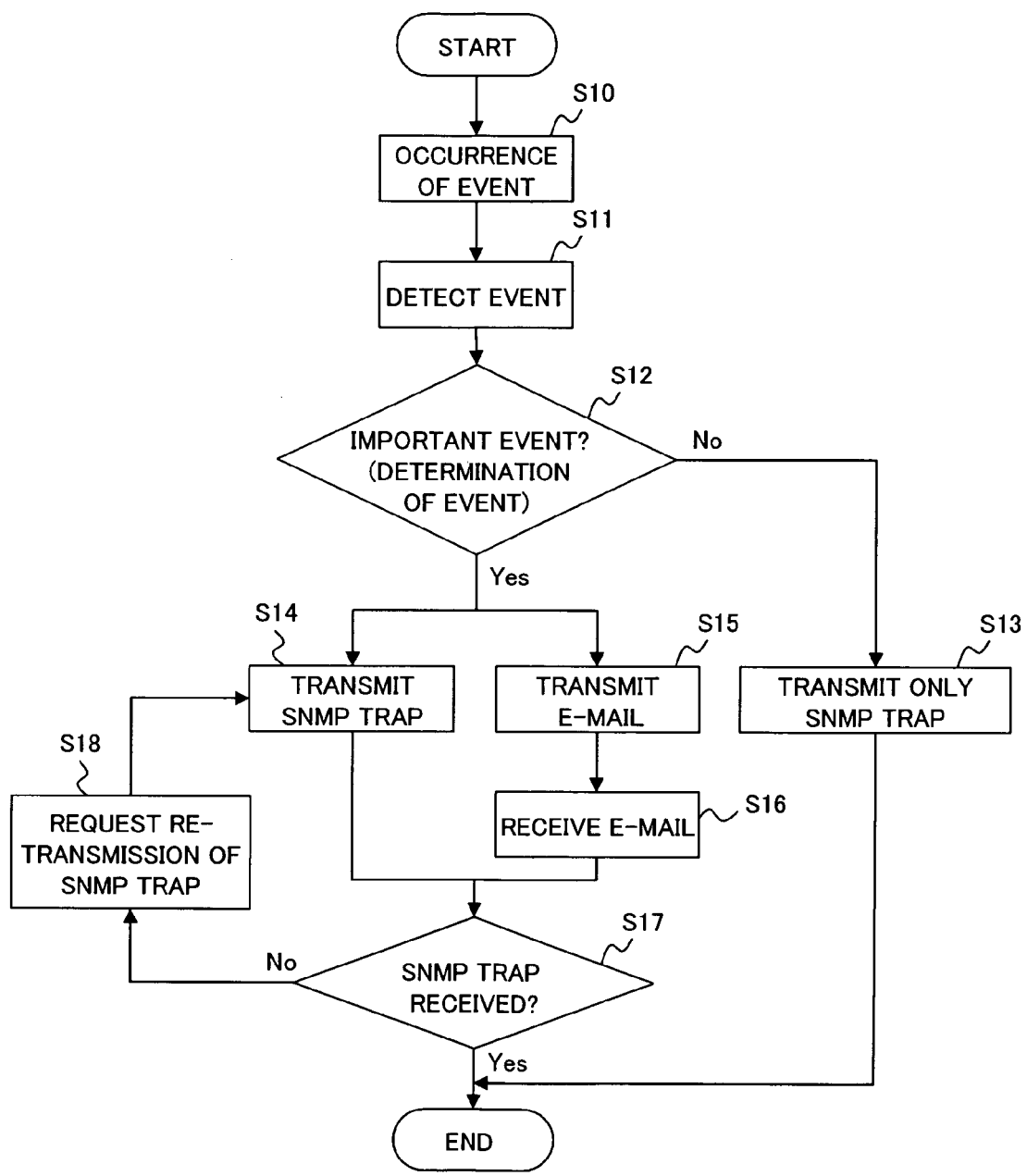
FIG. 3 is a flowchart for explaining the procedure of a monitoring method as the embodiment of the invention.

As shown in FIGS. 2 and 3, in the monitoring system 1, when an event occurs in the apparatus 10 to be monitored (see reference numeral 41 in FIG. 2 and step S10 in FIG. 3) and the event detecting unit 11 detects the event which has occurred (an event detecting step, see reference numeral 42 in FIG. 2 and step S11 in FIG. 3), the event determining unit 14 determines whether the event is to be notified by the e-mail transmitting unit 18 or not, that is, whether the event is an important event held in the event kind holding unit 15 or not on the basis of the event kind preliminarily held in the event kind holding unit 15 (an event determining step, see reference numeral 43 in FIG. 2 and step S12 in FIG. 3).

When the event determining unit 14 determines that the event is not an important event to be notified by the e-mail transmitting unit 18 (the route of "No" in step S12 in FIG. 3), without transmitting notification in the form of an e-mail by the e-mail transmitting unit 18, only the SNMP trap transmitting unit 17 transmits an SNMP trap of the event to the monitoring apparatus 20 (a first transmitting step, see step S13 in FIG. 3) and the process is finished.

On the other hand, when the event determining unit 14 determines that the event is an important event to be notified by the e-mail transmitting unit 18 (the route of "Yes" in step S12 in FIG. 3), the SNMP trap transmitting unit 17 transmits the SNMP trap of the event to the SNMP trap receiving unit 21 of the monitoring apparatus 20 (a first transmitting step, see reference numeral 44 and a solid-line arrow 45 in FIG. 2 and step S14 in FIG. 3) and, simultaneously, the e-mail transmitting unit 18 transmits the second information of the event to the e-mail receiving unit 22 of the monitoring apparatus 20 in the form of an e-mail (a second transmitting step, see reference numeral 44 and a broken-line arrow 46 in FIG. 2 and step S15 in FIG. 3).

Subsequently, when the e-mail receiving unit 22 of the monitoring apparatus 20 receives an e-mail transmitted from the e-mail transmitting unit 18 (a second receiving step, see reference numeral 48 in FIG. 2 and step S16 in FIG. 3), the reception determining unit 23 determines whether the SNMP trap receiving unit 21 has received the SNMP trap transmitted from the SNMP trap transmitting unit 17 or not (the first reception step; see reference numeral 47 in FIG. 2) (a reception determining step, see an alternate-long-and-short-dash-line arrow 50 in FIG. 2 and step S17 in FIG. 3). The reception determining step may be executed by an operation of the system monitor (see reference numeral 49 in FIG. 2) of the monitoring system 1 or may be automatically executed by the reception determining unit 23 of the monitoring apparatus 20 when the e-mail receiving unit 22 receives an e-mail.

When the reception determining unit 23 determines that the SNMP trap receiving unit 21 has received the SNMP trap corresponding to the second information received in the form of an e-mail by the e-mail receiving unit 22 (the route of "Yes" in step S17 in FIG. 3), the process is finished.

On the other hand, when the reception determining unit 23 determines that the SNMP trap receiving unit 21 has not received the SNMP trap corresponding to the second information received by the e-mail receiving unit 22 (the route of "No" in step S17 in FIG. 3), the re-transmission requesting unit 24 requests the SNMP trap transmitting unit 17 of the apparatus 10 to be monitored to re-send the SNMP trap, and the first transmitting step (step S14 in FIG. 3) is re-executed (a re-transmission requesting step, see an alternate-long-and-short-dash-line arrow 51 in FIG. 2 and step S18 in FIG. 3).

Until the reception determining unit 23 recognizes that the SNMP trap receiving unit 21 has received the SNMP trap (that is, the route of "Yes" of step S17 in FIG. 3), the re-transmission requesting step (step S18 in FIG. 3) and the first transmitting step (step S14 in FIG. 3) are repeated.

As described above, in the monitoring system 1 and the monitoring method as the embodiment of the invention, the event information of the event detected by the event detecting unit 11 of the apparatus 10 to be monitored is transmitted by an SNMP trap employing the connectionless communication method from the SNMP trap transmitting unit 17 to the monitoring apparatus 20 and, at the same time, the e-mail transmitting unit 18 transmits the event information in the form of an e-mail to the monitoring apparatus 20 by a communication method different from the connectionless communication method (in this case, the connection communication method of establishing a communication path prior to communication). Therefore, even if an SNMP trap transmitted from the SNMP trap transmitting unit 17 is lost, the second information as event information transmitted in the form of an e-mail by the e-mail transmitting unit 18 can be reliably received by the e-mail receiving unit 22 of the monitoring apparatus 20, and the monitoring apparatus 20 can reliably obtain the event information of the event detected by the event detecting unit 11.

Further, since the reception determining unit 23 of the monitoring apparatus 20 determines whether the SNMP trap receiving unit 21 has received an SNMP trap corresponding to the second information or not on the basis of the second information received by the e-mail receiving unit 22, the monitoring apparatus 20 can reliably and promptly recognize loss of the SNMP trap transmitted from the SNMP trap transmitting unit 17 of the apparatus 10 to be monitored.

Moreover, in the case where the reception determining unit 23 determines that the SNMP trap is not received by the SNMP trap receiving unit 21, the re-transmission requesting unit 24 causes the SNMP trap transmitting unit 17 to re-transmit the SNMP trap, so that the monitoring apparatus 20 can reliably obtain the SNMP trap.

With respect to an event which is determined, by the event determining unit 14 of the apparatus 10 to be monitored, to be notified by the e-mail transmitting unit 18 on the basis of the event kind preliminarily held in the event kind holding unit 15 (that is, the event which is regarded as an important event from the viewpoint of monitoring the system), the event is notified by the e-mail transmitting unit 18 to the monitoring apparatus. Consequently, the monitoring apparatus 20 can reliably and promptly recognize loss of an SNMP trap as an event notification which is important from the viewpoint of monitoring the system by the reception determining unit 23, and can reliably obtain the important event notification (SNMP trap) by the re-transmission requesting unit 24.

Specifically, by causing the event kind holding unit 15 to preliminarily hold an event which is important from the viewpoint of monitoring the system (for example, an event of a failure), in the case where an SNMP trap of important event information is lost and the system monitor of the monitoring apparatus 20 cannot recognize the occurrence of the important event, the reception determining unit 23 can determine the occurrence of the important event by referring to the record of the e-mail received by the e-mail receiving unit 22.

Further, the monitoring system 1 and the monitoring method as an embodiment of the invention can be realized only by adding a mechanism (the e-mail transmitting unit 18 and the e-mail receiving unit 22) performing communication between the apparatus 10 to be monitored and the monitoring apparatus 20 by a communication method (in this case, an e-mail of the connection communication method) different from the connectionless communication method to an existing (conventional) monitoring system employing only the connectionless communication method (SNMP trap). The existing monitoring system can be therefore easily improved. Similarly, a mechanism (the reception determining unit 23 and the re-transmission requesting unit 24) of recognizing loss of an SNMP trap and performing re-transmission can be easily applied to the existing monitoring system.

2. Others

The invention is not limited to the foregoing embodiment but can be variously modified without departing from the gist of the invention.

For example, in the foregoing embodiment, the configuration that the SNMP trap transmitting unit 17 of the apparatus 10 to be monitored transmits event information in the form of an SNMP trap as the connectionless communication method has been described as an example. The invention is not limited to the configuration but it is sufficient that the SNMP trap transmitting unit 17 notifies of event information by the connectionless communication method.

Although the configuration that the e-mail transmitting unit 18 of the apparatus 10 to be monitored transmits event information in the form of an e-mail has been described as an example in the foregoing embodiment, the invention is not limited to the configuration. It is sufficient that the e-mail transmitting unit 18 notifies of event information by a communication method different from the connectionless communication method. Preferably, the communication method by which event information can be notified reliably is employed.

In the foregoing embodiment, in the case where the event determining unit 14 determines that an event is notified by the e-mail transmitting unit 18, that is, in the case where the e-mail transmitting unit 18 transmits second information, the SNMP trap transmitting unit 17 may add information (numbering ID or marking) indicating that the second information is transmitted by the e-mail transmitting unit 18 to first information corresponding to the second information. Consequently, the system monitor using the monitoring apparatus 20 can determine an SNMP trap of an important event only by referring to the SNMP trap received by the SNMP trap receiving unit 21, which is held in the SNMP trap holding unit 25. Specifically, although it is difficult to promptly determine whether an SNMP trap is a trap of an important event or not on the basis of only a message of the SNMP trap, by adding information indicating that information is transmitted by the e-mail transmitting unit 18 to the SNMP trap, it can be determined immediately that the SNMP trap is a trap of an important event.

Although the re-transmission requesting unit 24 requests the SNMP trap transmitting unit 17 to re-transmit a lost SNMP trap in the foregoing embodiment, the invention is not limited to the configuration. The invention may be configured in such away that the same information as that of an SNMP trap is included in second information transmitted in the form of an e-mail by the e-mail transmitting unit 18, thereby generating an SNMP trap (first information) corresponding to the second information which was supposed to be received by the SNMP trap receiving unit 21 on the basis of the second information received by the e-mail receiving unit 22, and the SNMP trap holding unit 25 stores the generated SNMP trap (first information). With this configuration, a re-transmitting process can be omitted. Even in the case where loss of SNMP traps occur continuously or a failure that a communication path of the SNMP trap cannot be established occurs, the SNMP trap holding unit 25 of the monitoring apparatus 20 can reliably hold first information of an important event.

What is claimed is:

1. A monitoring system comprising:
  at least one monitored apparatus to be monitored as an object of monitoring; and
  a monitoring apparatus that monitors the monitored apparatus,
  wherein said monitored apparatus comprises:
  an event detecting unit configured to detect an event in the monitored apparatus;
  an event kind holding unit configured to hold kind information of failure event which is to be reliably obtained by the monitoring apparatus as an important event;
  an event determining unit configured to determine whether or not the event detected by the event detecting unit is the important event held in the event kind holding unit on the basis of the kind of the event preliminarily held in the event kind holding unit;
  a first transmitting unit configured to transmit first information as event information related to an event detected by the event detecting unit to said monitoring apparatus by a connectionless communication method and;
  a second transmitting unit configured to transmit second information as said event information to said monitoring apparatus by a communication method different from said connectionless communication method, simultaneously with transmitting first information when the event determining unit determines that the event is the important event held in the event kind holding unit on the basis of the kind of the event preliminarily held in the event kind holding unit,
  wherein said second information as said event information not to be transmitted to said monitoring apparatus by said second transmitting unit when said event determining unit determines that the event detected by the event detecting unit is not the important event held in said event kind holding unit,
  said monitoring apparatus comprises:
  a first receiving unit configured to receive said first information transmitted from said first transmitting unit;
  a second receiving unit configured to receive said second information transmitted from said second transmitting unit, wherein said second information is information with which said monitoring apparatus confirms whether or not said monitoring apparatus receives said first information;
  a reception determining unit configured to determine whether or not said first receiving unit has received said first information corresponding to said second information when said second receiving unit received said second information; and
  a re-transmission requesting unit configured to request said first transmitting unit of said monitored apparatus to re-transmit said first information in the case where the reception determining unit determines that said first receiving unit has not received said first information corresponding to said second information received by said second receiving unit when the second transmitting unit configured to transmit second information as said event information to said monitoring apparatus simultaneously with transmitting first information,
  wherein the monitoring apparatus monitors the monitored apparatus based on said first information.

2. The monitoring system according to claim 1, wherein:
  said monitored apparatus comprises an event information holding unit configured to hold said event information; and
  when re-transmission of said first information is requested by said re-transmission requesting unit, said first transmitting unit re-transmits the first information requested to be re-transmitted by said re-transmission requesting unit on the basis of said event information held in said event information holding unit.

3. The monitoring system according to claim 1, wherein said first transmitting unit transmits an SNMP (Simple Network Management Protocol) trap as said first information.

4. The monitoring system according to claim 1, wherein said second transmitting unit transmits said second information by a connection communication method.

5. The monitoring system according to claim 1, wherein said second transmitting unit transmits said second information by an e-mail.

6. The monitoring system according to claim 1, wherein in the case where said second transmitting unit transmits said second information, said first transmitting unit adds information indicating that the second information is transmitted by said second transmitting unit to said first information corresponding to the second information.

7. A monitored apparatus to be monitored as an object of monitoring of a monitoring apparatus, comprising:
   an event detecting unit configured to detect an event which occurs in the monitored apparatus itself;
   an event kind holding unit configured to hold kind information of failure event which is to be reliably obtained by the monitoring apparatus as an important event;
   an event determining unit configured to determine whether or not the event detected by the event detecting unit is the important event held in the event kind holding unit on the basis of the kind of the event preliminarily held in the event kind holding unit;
   a first transmitting unit configured to transmit first information as event information related to an event detected by the event detecting unit to said monitoring apparatus by a connectionless communication method; and
   a second transmitting unit configured to transmit second information as said event information to said monitoring apparatus by a communication method different from said connectionless communication method, simultaneously with transmitting first information when the event determining unit determines that the event is the important event held in the event kind holding unit on the basis of the kind of the event preliminarily held in the event kind holding unit,
   wherein said second information as said event information not to be transmitted to said monitoring apparatus by said second transmitting unit when said event determining unit determines that the event detected by the event detecting unit is not the important event held in said event kind holding unit,
   wherein said second information is information with which said monitoring apparatus confirms whether or not said monitoring apparatus receives said first information when said monitoring apparatus received said second information,
   said monitored apparatus further comprises:
   an event information holding unit configured to hold said event information, wherein when re-transmission of said first information is requested by said monitoring apparatus when the second transmitting unit configured to transmit second information as said event information to said monitoring apparatus simultaneously with transmitting first information, said first transmitting unit re-transmits the first information requested to be re-transmitted by said monitored apparatus on the basis of said event information held in said event information holding unit.

8. The monitored apparatus according to claim 7, wherein said first transmitting unit transmits an SNMP (Simple Network Management Protocol) trap as said first information.

9. The monitored apparatus according to claim 7, wherein said second transmitting unit transmits said second information by a connection communication method.

10. The monitored apparatus according to claim 7, wherein said second transmitting unit transmits said second information by an e-mail.

11. The monitored apparatus according to claim 7, wherein in the case where said second transmitting unit transmits said second information, said first transmitting unit adds information indicating that the second information is transmitted by said second transmitting unit to said first information corresponding to the second information.

12. A monitoring apparatus that monitors a monitored apparatus to be monitored, comprising:
   a first receiving unit configured to receive first information as event information related to an event in said monitored apparatus, which is transmitted from said monitored apparatus by a connectionless communication method; and
   a second receiving unit configured to receive second information as said event information transmitted from said monitored apparatus by a communication method different from the connectionless communication method when the event detected in the monitored apparatus is determined that the event is an important event on the basis of kind of the event preliminarily held in an event kind holding unit of the monitored apparatus configured to hold kind information of failure event which is to be reliably obtained by the monitoring apparatus as the important event by the monitored apparatus, said second information being transmitted simultaneously with the transmission of said first information from said monitored apparatus by the connectionless communication method, wherein said second information is information with which said monitoring apparatus confirms whether or not said monitoring apparatus receives said first information,
   wherein said second information as said event information not to be transmitted to said monitoring apparatus by the monitored apparatus when the monitored apparatus determines that the event detected by the monitored apparatus is not the important event held in said event kind holding unit,
   said monitoring apparatus further comprises:
   a reception determining unit configured to determine whether or not said first receiving unit has received said first information corresponding to said second information when said second receiving unit received said second information; and
   a re-transmission requesting unit configured to request said monitored apparatus to re-transmit said first information in the case where the reception determining unit determines that said first receiving unit has not received said first information corresponding to said second information received by said second receiving unit when said monitored apparatus configured to transmit second information as said event information to said monitoring apparatus simultaneously with transmitting first information,
   wherein the monitoring apparatus monitors the monitored apparatus based on said first information.

13. A monitoring method of monitoring a monitored apparatus to be monitored by a monitoring apparatus based on first information of an event detected in said monitored apparatus, comprising:

an event determining step that determines whether or not the event detected by the monitored apparatus is an important event on the basis of kind of the event preliminarily held in an event kind holding unit configured to hold kind information of failure event which is to be reliably obtained by the monitoring apparatus as the important event;

a first transmitting step that transmits said first information from said monitored apparatus to said monitoring apparatus by a connectionless communication method; and a second transmitting step that transmits second information as said event information from said monitored apparatus to said monitoring apparatus by a communication method different from said connectionless communication method, simultaneously with transmitting first information when the event is determined in the event determining step that the event is the important event held in the event kind holding unit on the basis of the kind of the event preliminarily held in the event kind holding unit, wherein said second information as said event information not to be transmitted to said monitoring apparatus in said second transmitting step when the event detected by the monitored apparatus is determined that the event is not the important event held in said event kind holding unit in said event determining step, the monitoring method further comprises:

a first receiving step that receives said first information transmitted from said monitored apparatus in said first transmitting step;

a second receiving step that receives said second information transmitted in said second transmitting step by said monitoring apparatus, wherein said second information is information with which said monitoring apparatus confirms whether or not said monitoring apparatus receives said first information;

a reception determining step that determines whether or not said first information corresponding to said second information is received by said monitoring apparatus in said first receiving step when said second information is received in said second receiving step; and a re-transmission requesting step that re-executes said first transmitting step in the case where it is determined in the reception determining step that an SNMP trap corresponding to said second information received by said second receiving unit has not been received in said first receiving step when second information is transmitted in the second transmitting step as said event information to said monitoring apparatus simultaneously with transmitting first information.

14. The monitoring method according to claim 13, wherein an SNMP (Simple Network Management Protocol) trap is transmitted as said first information in said first transmitting step.

15. The monitoring method according to claim 13, wherein said second information is transmitted by a connection communication method in said second transmitting step.

16. The monitoring method according to claim 13, wherein said second information is transmitted by an e-mail in said second transmitting step.

17. The monitoring method according to claim 13, wherein in the case of transmitting said second information in said second transmitting step, in said first transmitting step, information indicating that the second information is transmitted in said second transmitting step is added to said first information corresponding to the second information.

18. The monitoring system according to claim 1, wherein said kind information of the failure event held in the event kind holding unit is a kind information of an important event for monitoring said monitored apparatus; and when the event detected by said event detecting unit is determined, by said event determining unit, as a not important event corresponding to said kind information held in said event kind holding unit, information of the event is transmitted only by said first transmitting unit, and when the event detected by said event detecting unit is determined as an important event corresponding to said kind information, information of the event is transmitted by said first transmitting unit and corresponding information of the event is transmitted simultaneously by said second transmitting unit.

19. The monitoring system according to claim 1, wherein said monitored apparatus further comprises:

a hardware information detecting unit that detects an event related to hardware in said monitored apparatus;

an operating system (OS) information detecting unit that detects an event related to an OS operated in said monitored apparatus; and a data converting unit that converts information corresponding to an event detected by said hardware information detecting unit or by said OS information detecting unit into the event information so as to be handled in said event determining unit;

wherein said event determining unit determines whether the event information converted by said data converting unit is to be transmitted by said second transmitting unit.

* * * * *